May 31, 1932.  A. A. GLIDDEN ET AL  1,860,411
APPARATUS AND PROCESS FOR VULCANIZING RUBBER COATED FABRIC
Filed Sept. 28, 1927   2 Sheets-Sheet 1

Inventors.
Alfred A. Glidden.
Thomas H. Knowland.
Warren R. Dow.
by their atty. Charles L. Gooding Inventors.
Alfred A. Glidden.
Thomas M Knowland.
Warren R. Dow.
by their atty Patented May 31, 1932

1,860,411

UNITED STATES PATENT OFFICE

ALFRED A. GLIDDEN, THOMAS M. KNOWLAND, AND WARREN R. DOW, OF WATERTOWN, MASSACHUSETTS, ASSIGNORS, BY MESNE ASSIGNMENTS, TO HOOD RUBBER COMPANY, INC., OF WILMINGTON, DELAWARE, A CORPORATION OF DELAWARE

APPARATUS AND PROCESS FOR VULCANIZING RUBBER COATED FABRIC

Application filed September 28, 1927. Serial No. 222,646.

This invention relates to an apparatus and process for vulcanizing rubber coated fabric.

The object of the invention is to provide an efficient apparatus in which a continuous length of rubber coated fabric may be vulcanized by heat, and to a process of vulcanizing said fabric in said apparatus.

In the apparatus of this invention a loosely wound roll of rubber coated fabric, treated with a suitable sizing material to prevent sticking, is mounted between guide ways upon a fabric conveyer belt outside a heated chamber and adjacent to one end thereof, and as the conveyer belt travels beneath the roll of fabric the latter is slowly unwound from said roll onto the belt and is fed by the belt into the chamber passing therethrough to the opposite end thereof, where it is transferred to another belt travelling in an opposite direction in said chamber, the fabric finally emerging from the chamber at the same end that it originally entered.

The apparatus of this invention embodies therein an efficient heating system, preferably electrical, together with a means for maintaining a uniform temperature throughout the interior of the chamber, and to assist in accomplishing this result a circulatory air system is provided by means of which the heated air within the chamber is withdrawn from the top of the chamber and again returned thereto adjacent to the bottom thereof. The temperature of the heating chamber and speed at which the conveyer belts travel therethrough are so regulated that when the fabric emerges from the chamber it will be thoroughly vulcanized.

The invention consists in an apparatus and process for vulcanizing rubber coated fabric as set forth in the following specification and particularly as pointed out in the claims thereof.

Referring to the drawings.

Like numerals refer to like parts throughout the several views of the drawings.

Figure 1:
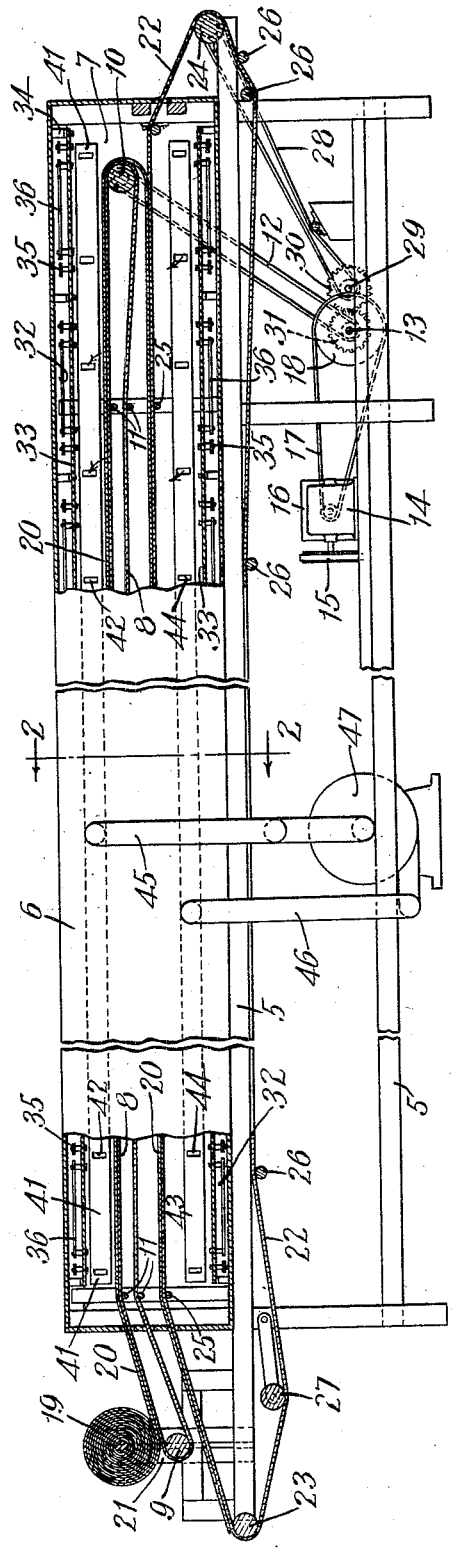
Figure 1 is a sectional elevation of an apparatus for curing rubber fabric embodying our invention, portions of said apparatus being broken away to save space in the drawings.
Figure 2:
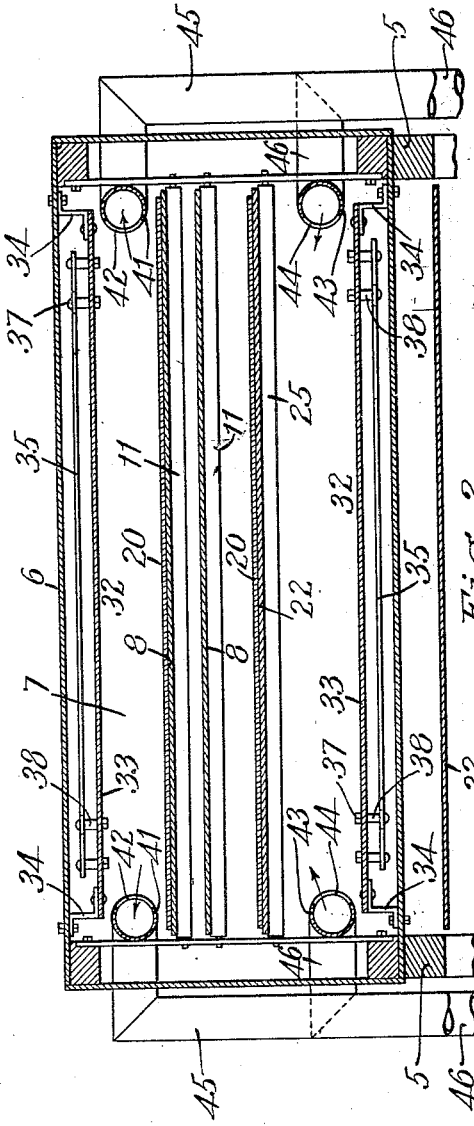
Fig. 2 is an enlarged transverse section through a portion of the apparatus as taken on the line 2—2 of Fig. 1.

In the drawings, 5 represents a frame upon which a casing 6 is mounted, said casing having a chamber 7 provided upon the interior thereof. Located partly upon the exterior of the casing 6 and partly within the chamber 7 of said casing is an endless conveyer belt 8, said belt preferably being constructed of fabric and at its opposite end portions extending around rolls 9 and 10, the roll 9 being located upon the exterior of the casing 6 adjacent to one end of said casing, and the roll 10 being located within the chamber 7 adjacent to the other end of said casing. Intermediate portions of the conveyer belt 8 are supported within the chamber 7 upon a plurality of rollers 11 which are located at suitable points throughout the length of the chamber.

The roll 10, which constitutes a driving roll for the belt 8, is driven through a driving member 12 from a countershaft 13 mounted in suitable bearings on the frame 5, said counter shaft being driven from an electric motor 14, the motive power of which is transferred through a driving connection 15 to a speed-reducing mechanism 16 from which said power is transferred at a reduced speed through another driving connection 17 to a pulley or sprocket 18 fast to the countershaft 13.

A roll 19 of rubberized fabric 20 to be vulcanized is mounted between guideways 21 above the roll 9 in such a position that said roll 19 will rest upon the conveyer belt 8 and the friction between said belt and roll will cause the fabric to unwind and be fed by said belt into and through the chamber 7 until the fabric reaching the roll 10 will be transferred from the belt 8 to another conveyer belt 22 which is located beneath the belt 8. The belt 22 is mounted upon a pair of main rolls 23 and 24, which are located upon the exterior of the casing 6 at opposite ends thereof, and intermediate portions of said belt are supported and guided by a plurality of rollers 25 located at suitable points within the chamber 7 and a plurality of rollers 26 which are located beneath the casing 6. The belt 22 is also provided with a take-up roll 27. The belt 22 is driven through the chamber 7 in an opposite direction to that of the belt 8 by the roll 24, which constitutes a driving roll, motion being imparted to the roll 24 by a suitable driving connection 28 driven from a countershaft 29, the latter having a gear 30 fast thereto which meshes with and is driven by a gear 31 fast to the countershaft 13.

As the fabric 20 is transferred from the belt 8 to the belt 22 the positions of the upper and under surfaces of the fabric are reversed and the fabric is again fed the length of the chamber 7 finally emerging from the end of the casing through which it originally entered. The fabric is discharged from the belt 22 at the roll 23.

Figure 3:
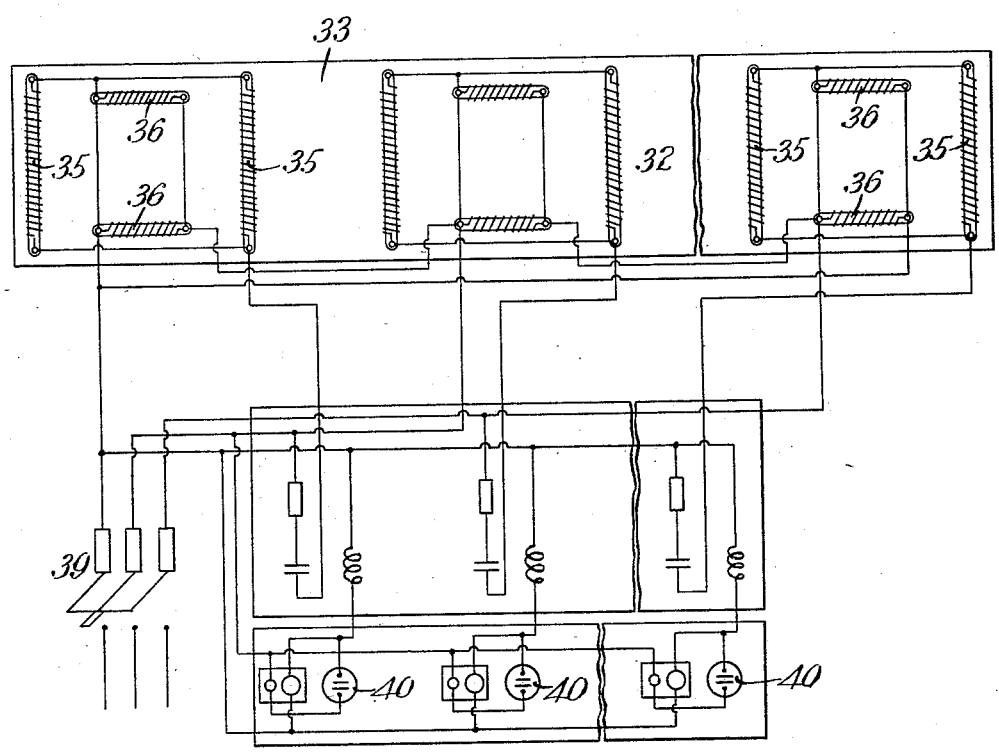
Fig. 3 is a diagrammatic representation of the electric heating means for the apparatus.
Figure 4:
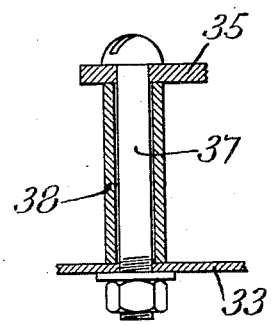
Fig. 4 is an enlarged detail setcion illustrating the manner of supporting one of the heating units upon a baffle plate.

While passing through the chamber 7 the fabric 20 is subjected to heat generated by a pair of electric heaters 32, one of said heaters being located at the top of the chamber 7 and the other being located at the bottom of the chamber. Each heater 32 embodies therein a thin metal plate 33 which constitutes a baffle plate and is supported upon a plurality of brackets 34 fast to the casing 6. Each baffle plate 33 extends for approximately the full length of the chamber 7 and is utilized as a support for a plurality of heating units 35 and 36, the former extending laterally of the baffle plate 33 and the units 36 extending longitudinally of said baffle plate. The heating units 35 and 36 may be of any suitable construction well known in the art and are supported at a distance from the baffle plate 33 by bolts 37 and spacing members 38. The various heating units are all connected by suitable wires, see Fig. 3, with a main source of electric power at a switch 39. The heating system furthermore includes a plurality of thermostats 40 which may be positioned as desired within the chamber 7 and when the temperature within said compartment rises or fluctuates beyond certain predetermined limits, these thermostats operate in a manner well known to those skilled in the art to open or close the circuits to certain of the heating units.

As an aid in maintaining the interior of the chamber 7 at a uniform temperature a means is provided for recirculating air within said chamber as follows:—Extending longitudinally through the chamber 7 adjacent to the top thereof and upon opposite sides thereof are flues 41, each of which is provided with a plurality of apertures 42. In like manner another pair of flues 43 are located at the bottom of the chamber 7, said flues being provided with a plurality of apertures 44. The flues 41 and 43 are connected by pipes 45 and 46 respectively with a blower 47 which is adapted to withdraw the heated air from the chamber 7 into the flues 41 through the apertures 42 and discharge said heated air into said chamber through the flues 43 and apertures 44, thereby recirculating the air within the chamber 7.

The general operation of the apparatus hereinbefore specifically described and the process of vulcanizing a rubber coated fabric by said apparatus is as follows:—The fabric first calendered with a vulcanizable rubber compound and treated with a suitable sizing material to prevent sticking, and loosely wound in a roll 19 is unwound from said roll by engagement with the belt 20 and fed in a loose condition while resting upon said belt through the chamber 7, preferably with the rubber-coated surface facing upwards. When the fabric reaches the opposite end of the chamber 7 from which it entered, it is transferred to the belt 22 which is travelling in the opposite direction to that in which the belt 8 is travelling and the material is again fed the length of the chamber 7, being discharged therefrom at the end that it originally entered, where it is wound upon a shell not shown in the drawings. When the fabric is transferred from the belt 8 to the belt 22 the upper and under surfaces of the fabric are reversed. During the interval that the fabric remains within the chamber 7 it is subjected to heat generated at the heaters 32, one of which is located at the top of the chamber 7 and the other at the bottom of the chamber and the temperature maintained within the chamber is sufficient to thoroughly vulcanize the rubber coating. The air recirculating system aids in maintaining the temperature at a uniform degree of heat throughout the heating chamber.

We claim:

1. An apparatus for vulcanizing rubber coated fabric comprising, in combination, a chamber, a conveyer belt to feed the fabric loosely into and through said chamber, another belt beneath said first-named belt and travelling in an opposite direction thereto, said last-named belt receiving the fabric from said first-named belt and reversing the positions of the upper and under surfaces of said fabric and feeding the same loosely through and out of the chamber, means within the chamber to heat the air therein, and means to withdraw said heated air from the chamber and return the same thereto.

2. An apparatus for vulcanizing rubber coated fabric comprising, in combination, a chamber, a conveyer belt to feed the fabric loosely into and through said chamber, another belt beneath said first-named belt and travelling in an opposite direction thereto, said last-named belt receiving the fabric from said first-named belt and reversing the positions of the upper and under surfaces of said fabric and feeding the same loosely through and out of the chamber, a plurality of heating units within the chamber and positioned a uniform distance from the fabric located upon the conveyer belts, a plurality of flues within said chamber, and means to withdraw air from the chamber through certain of said flues and return said air into said chamber through other of said flues.

3. An apparatus for vulcanizing rubber coated fabric comprising, in combination, a chamber, a conveyer belt to feed the fabric loosely into and through said chamber, another belt beneath said first-named belt and travelling in an opposite direction thereto, said last-named belt receiving the fabric from said first-named belt and reversing the positions of the upper and under surfaces of said fabric and feeding the same loosely through and out of the chamber, baffle plates positioned in parallel relation to the surface of the fabric upon the conveyer belts, and a plurality of electric heating units mounted upon said baffle plates and positioned a uniform distance from the fabric located upon the conveyer belts, means to regulate the temperature within said chamber, a plurality of flues within said chamber each provided with a plurality of apertures therein, and means to withdraw the air from the chamber through the apertures of certain of said flues and return said air into said chamber through the apertures of the other of said flues.

4. The process of vulcanizing rubberized sheet material which comprises heating a gaseous vulcanizing medium within a chamber, circulating the gaseous medium throughout the chamber, and then feeding the material through the chamber and directly exposing both sides of the material to the gaseous medium within the chamber.

5. A method as defined in claim 4 in which the opposite sides of the material are exposed in alternation to the vulcanizing medium.

In testimony whereof we have hereunto set our hands.

ALFRED A. GLIDDEN.
THOMAS M. KNOWLAND.
WARREN R. DOW.